United States Patent Office 3,322,124
Patented May 30, 1967

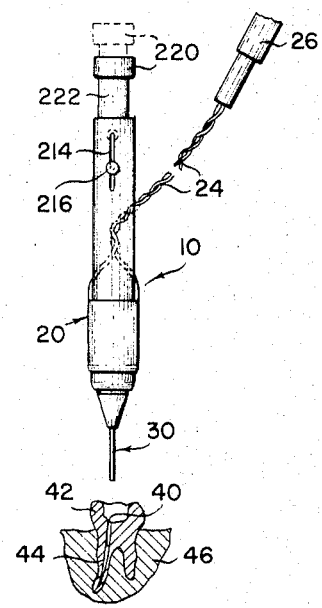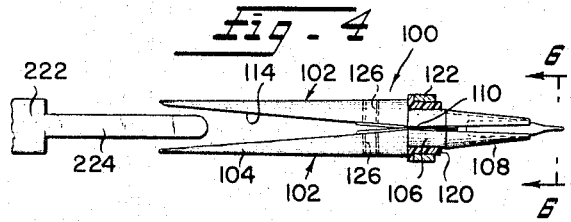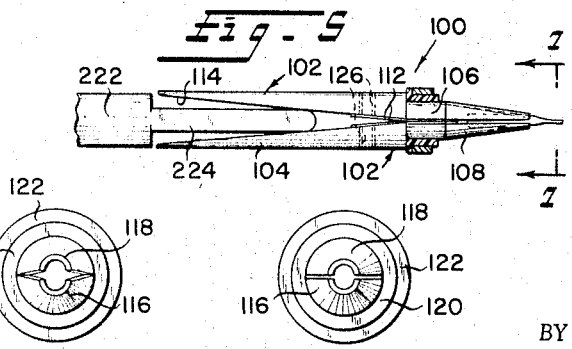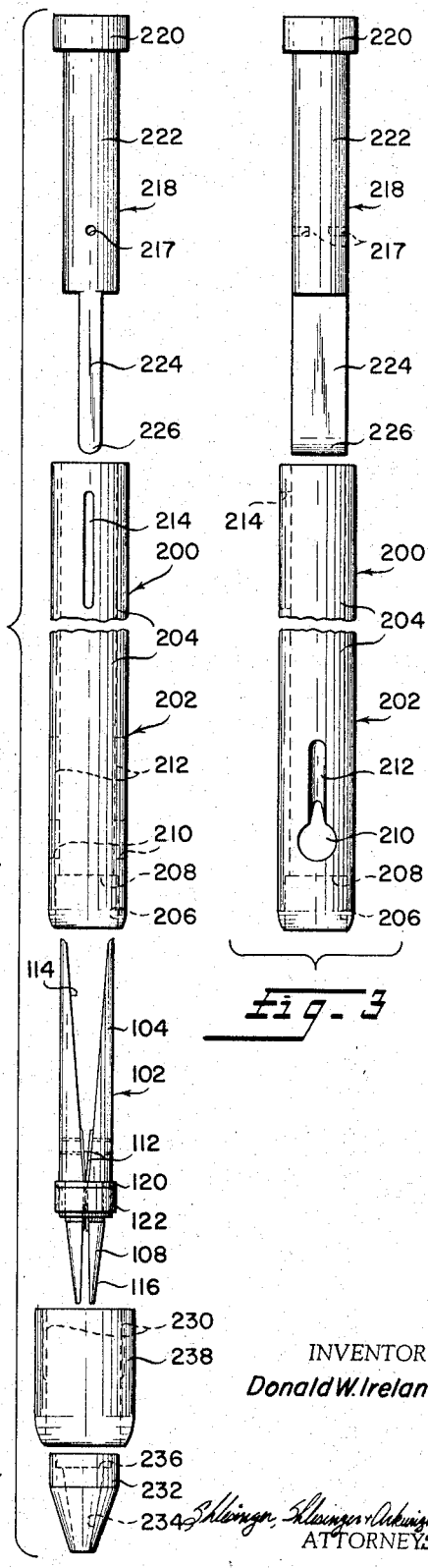
May 30, 1967     D. W. IRELAND     3,322,124
METHOD AND APPARATUS FOR RETRIEVING METALLIC OBJECTS
FROM TEETH, FLESH, BONE AND THE LIKE
Filed Nov. 25, 1964     3 Sheets-Sheet 1
INVENTOR
*Donald W. Ireland*
ATTORNEYS

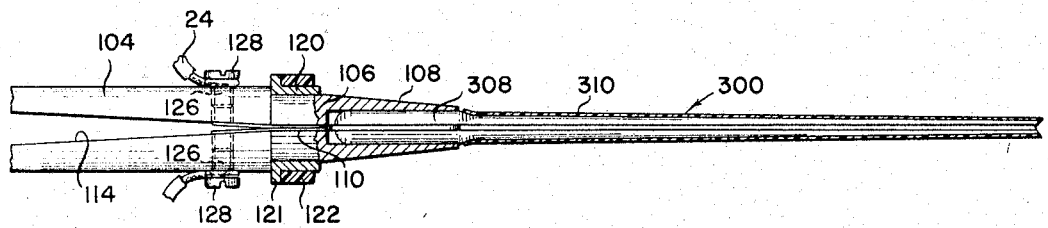
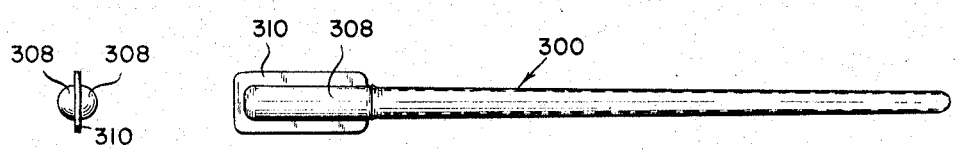
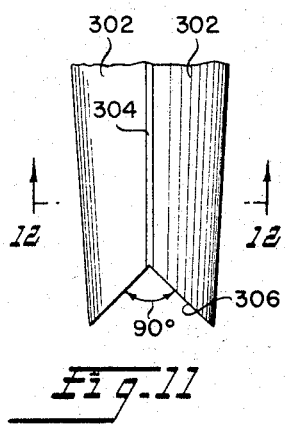
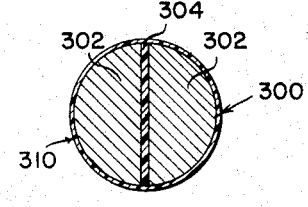
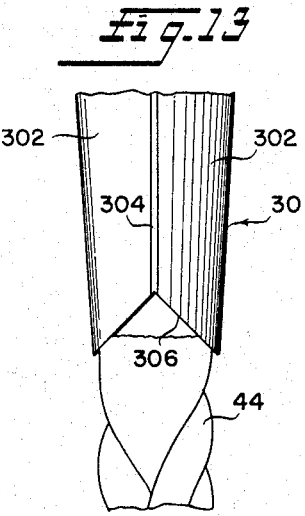
INVENTOR
Donald W. Ireland

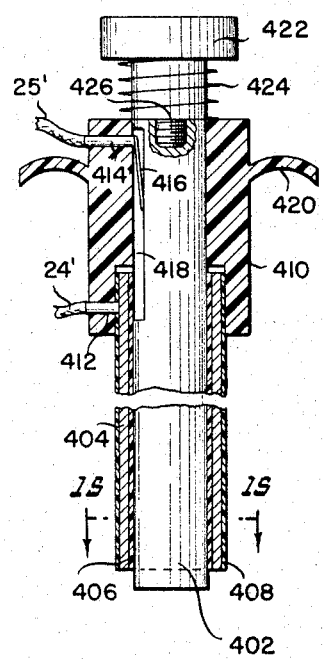
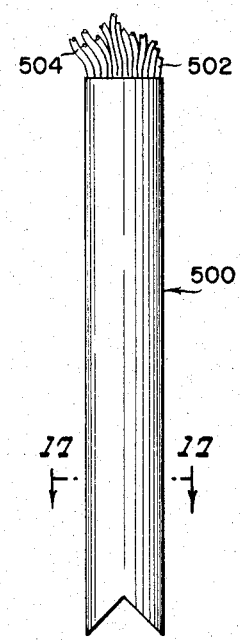
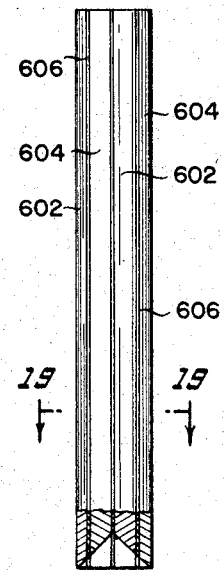
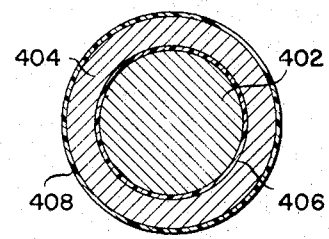
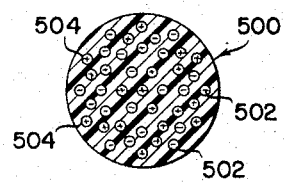
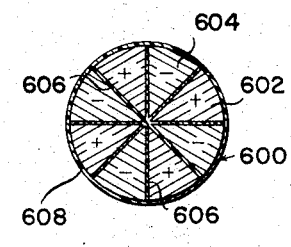

3,322,124
METHOD AND APPARATUS FOR RETRIEVING METALLIC OBJECTS FROM TEETH, FLESH, BONE AND THE LIKE
Donald W. Ireland, R.D. 2, Newark, Del. 19711
Filed Nov. 25, 1964, Ser. No. 413,714
11 Claims. (Cl. 128—303)

This invention relates to dental instruments, more particularly to a method and apparatus for retrieving a broken reamer or drill from a tooth root canal.

In the field of dentistry it is often necessary to remove the nerve from a tooth to prevent the tooth from further decay. This is done by what is known as a reaming a root canal. Teeth contain nerves extending from the jawbone to each root apex of a tooth and into the interior of the tooth itself. When a tooth is devitalized, the nerve is drilled out by extending a canal down into each root, through the pulp chamber.

Since these canals are rather narrow and since the instruments used to do this are very delicate, the reamer or drill will occasionally break off deep in the tooth.

Retrieving the broken drill or instrument usually involves surgery and can be a rather long, time consuming and painful procedure. This is particularly true if the broken instrument must be drilled out or otherwise retrieved. Since the dentist's time is quite valuable, it is of extreme importance to the dentist and the patient that the broken drill be removed from the tooth as quicktly as possible, without damage to the tooth root canal.

It is therefore a purpose of this invention to provide an instrument for retrieving a broken reamer rapidly, efficiently and painlessly.

It is a further object of this invention to provide a method for retrieving a broken root canal drill.

Still another object is to provide a probe which is adapted to be welded to the broken reamer, the probe and reamer being removed together.

It is further an object of the invention to provide a welding probe with a plurality of electrodes for the purpose of attaching itself to an object embedded in a drill hole.

Another object of this invention is to provide an economical instrument for painlessly and efficiently extracting a broken root canal instrument from a tooth.

Still another object is to provide a welding probe clamp for releasably holding a welding probe.

A further object of this invention is to provide a welding probe clamp wherein there is included a means for connecting a source of electrical current to positive and negative electrodes.

Another object of this invention is to provide an instrument for the removal of all sorts of metallic particles from flesh and bone or the like such as bullets, shrapnel, broken hypodermic needles, bits of wire, metal splinters and other metal objects often found in flesh and tissue as the result of accident or injury.

It is a further object to provide a welding probe and clamp wherein means is provided to connect a source of electrical potential to a plurality of elongated electrodes within a single probe.

Summary

One form of the invention includes the method of inserting a welding probe into a root canal where a broken instrument is lodged, applying a current to weld the probe to the broken reamer and removing both the reamer and the probe attached thereto.

In another embodiment of the invention a welding probe is composed of two electrodes insulated from one another and of a shape which will provide means to contact the broken instrument.

In further form of the invention this probe is composed of two hemi-cylindrical electrodes. In another form these two electrodes are concentrically insulated from one another.

In another form of the invention the probe is composed of a bundle of solid wires each insulated from one another within a probe body.

In still another form of the invention a plurality of wedged shaped cylindrical segments are insulated from one another and alternately connected to positive and negative terminals.

In one embodiment the electrodes are movable relative to one another.

In one embodiment of the clamp structure a pair of probe gripping members are insulated from one another at the fulcrum and have a rearward portion which is adapted to be engaged by a plunger member to variably open and close the jaw structure of the forward portion thereof. The probe gripping members are surrounded by an insulating band to provide the pivoting motion. The entire clamp may be inserted in an insulating housing which includes means to connect a source of electrical potential to the probe gripping members.

In the overall structure a dental instrument for retrieving root canal instruments includes a probe of the type described above releasably inserted within a welding probe clamp of the type defined above.

Other objects, advantages and features of the invention will appear obvious, and the invention may be better understood from the accompanying drawings, detailed description and the amended claims wherein:

FIGURE 1 is a side elevation view of the entire instrument about to be inserted into a root canal drilled in a tooth which is shown in cross section, FIGURES 2 and 3 are exploded views of the clamp and housing, FIGURE 4 is a side elevation partly in cross-section of the clamp per se with the plunger in its outward position, FIGURE 5 is a side elevation view partly in cross-section of the clamp with the plunger in the forward position compressing the jaws at the forward portion of the clamp, FIGURE 6 is a front view taken along lines 6—6 of FIGURE 4, FIGURE 7 is a front view of the clamp taken along lines 7—7 of FIGURE 5, FIGURE 8 is a side elevation view partly in cross-section of one form of the probe inserted within the clamp, FIGURE 9 is an end view of one embodiment of the probe, FIGURE 10 is a side view of one form of the probe, FIGURE 11 is an enlarged detail of the end of the probe shown in FIGURE 10, FIGURE 12 is a cross-section taken along lines 12—12 of FIGURE 11, FIGURE 13 shows the welding probe of FIGURE 11 adjacent and touching a broken instrument, FIGURE 14 is a side elevation view partially broken away, of another embodiment of the welding probe and clamp, FIGURE 15 is an enlarged cross-sectional view of the welding probe shown in FIGURE 14 taken along lines 15—15, FIGURE 16 is another embodiment of the welding probe, FIGURE 17 is an enlarged cross-sectional view of the welding probe shown in FIGURE 16 taken along lines 17—17, FIGURE 18 is a side elevation view of still another embodiment of the welding probe, and FIGURE 19 is an enlarged cross-sectional view of the welding probe shown in FIGURE 18 taken along lines 19—19.

Instrument structure

Referring now to the drawings, particularly to FIGURE 1, wherein the root canal instrument retriever is shown generally at 10 and includes a clamp and holder 20 and a welding probe 30. The probe 30 is inserted into a root canal 40 in a tooth 42. The tooth 42 has a portion of a drill or reamer 44 located deep in the canal. The entire tooth 42 is shown embedded in the jawbone 46 in the patient's mouth.

The welding probe 30 is releasably secured to the clamp 20 (in a manner discussed more fully below) by the depression and retraction of the plunger 218 FIGURE 2. Electrical current is provided to the clamp and probe by means of a pair of wires 24 and a conventional plug 26.

Clamp structure

Referring now to FIGURES 2 through 7, a clamp per se is shown generally at 100 and a housing therefor is shown generally at 200. The clamp is composed of two probe gripping members 102 having a rearward portion 104, a central portion at 106 and a forward portion 108. The two gripping members 102 are pivoted at a fulcrum 110 which is provided with an insulating material 112 which may be a piece of foldeld fiber glass strip as shown or some other typical material. This will insure that the electrodes are not in contact with one another.

Each rearward portion 104 is tapered substantially to a point along an inner surface 114. The forward portion 108 is tapered along the outer surface thereof to form a conical section as indicated at 116. An inner surface 118, as best seen in FIGURES 6 and 7, is formed with a hemi-cylindrical opening to accommodate a cylindrical probe.

The two gripping members are held together by means of a collar 120 which is composed of an insulating member such as Teflon and a rigid force exerting outer ring 122 which is best made of stainless steel. The inner insulating ring 120 as seen in FIGURE 8 is provided with a flange 121 against which the outer ring abuts.

In order to provide a source of electrical energy to the electrodes, each has means such as aperture 126 for connecting the source. Screws 128 may be inserted in the apertures to connect wires 24.

Housing structure

Referring particularly to FIGURES 2 and 3 wherein the clamp 100 is inserted into housing 200. The housing 200 includes a cylindrical portion 202 which has a concentric opening therethrough at 204. A recessed opening is provided at 206 having a surface 208 against which flange 121 abuts. The wall is provided with a pair of apertures 210 which will accommodate screws 128 and wires 24. Adjacent and running into the apertures 210 are a pair of slots 212 which will accommodate the wires 24 in a substantially flush manner with respect to the outer cylindrical surface.

An elongated slot 214 is included in the cylindrical housing 202. This will accommodate a pin 216 which is seen in FIGURE 1, the pin also being inserted into a hole 217.

Within the upper end of housing 202 is a plunger 218 which comprises an end grip 220, a central portion 222 and a generally flat projection 224, at the end of which is formed a rounded camming surface at 226. As seen in FIGURES 4 and 5, when the device is in its assembled position, the flat portion 224 and camming surface 226 reciprocate within the tapered portions 114 of gripping members 102, thus opening and closing the gripping jaws.

When the device is in its assembled position, a collar 238 slips over the end of the housing 202 and covers the apertures 210 and grooves 212, thus providing an insulating surface over the screws 128. The collar 238 includes a pair of recessed inner surfaces 230 which correspond to the grooves 212. This will accommodate wires which extend above the outer circumference of the cylindrical housing.

At the lowermost end of the housing is a conical cover 232 having an opening 234 and a flange portion 236 which abuts against the force exerting ring 122. This will provide a complete insulating surface over the forward portions 108 of the gripping members.

Hemi-cylindrical probe structure

As seen in FIGURES 8 through 13 a probe 300 is provided with two electrodes 302 separated by a thin film of insulation 304. For the delicate instrument of the instant device, a thickness of 3-5 mils is advisable. At one end of the probe the electrodes 302 are beveled at 306 toward the insulation 304. This taper may be between 60 and 120 degrees, with 90 degrees a preferable figure. The 90° angle tends to equalize the electrical resistance between the two points of contact between the probe and reamer, forming a more uniform and stronger bond.

At the other end of the probe the electrodes 302 are provided with a pair of conductive connecting portions 308 which fit into the forward portion of the jaws 108 at the curved surface 118. So that the probe may be properly aligned with regard to the gripping members an insulation surface 310, which may be an extension of 304, is extended outwardly beyond the outer circumference of the connecting portions 308.

The outer surface of the probe may be tapered toward the end which comes in contact with the broken reamer 44. This outer surface is further insulated by covering film 310 between 3 to 5 mils thick to prevent conduction of current to any part of the tooth except where the probe is connected to the broken reamer or other instrument.

Dual-conductor probe

Referring now to FIGURES 14 and 15, the welding probe 400 includes an inner electrode 402 and outer electrode 404, spaced from each other by insulation 406. The outer electrode is covered with insulation 408 similar to 310 in the embodiment shown in FIGURE 8.

The surface of the probe 408 near the end which is to be inserted in the tooth, may have a thin covering of Teflon which permits easier insertion of the probe into the tooth root canal. The cross-sectional area of the two electrodes is preferably the same so that both will carry the same amount of current. The end structure may be V-shaped or flat.

The center element 402 is preferably permitted to move within the probe to contact the reamer tip, after similar contact has been established by the outer tube or shell 404. This movement may be either rotational about the center axis or longitudinal within the member 404 which will allow for proper contact with the broken reamer by both electrodes simultaneously.

This movement may be accomplished by providing a clamp or holder 410 formed of insulation which will rigidly hold the outer electrode 404. Current is provided from wire 24' to the electrode by means of connection 412. A second electrical connection from a wire 25' is provided through a connection 414 to a spring leaf 416 which rubs against a recess 418 in electrode 402. Finger grips may be provided as seen at 420. The inner electrode 402 is moved by means of handle or other gripping means 422 provided at the end of the movable electrode. The handle 422 in this embodiment is threaded into 402 at 424, this is shown provided with a biasing means such as a spring 426.

Multi-wire conductor probe

Schematically illustrated in FIGURES 16 and 17 is a multi-conductor type probe 500. This probe is composed of a bundle of solid metal wires 502 and 504. These wires are insulated from one another within the probe body. This may be done by coating each individual wire or inserting the bare wires in a mass of insulation. There are approximately an equal number of positive and negative conductors scattered randomly throughout. The conductors 502 are conected to the negatvie source of power and conductors 504 are connected to the positive side. The insulating medium may be a cylinder of Teflon with holes running the entire length. The conductors may be free to move within the holes so that each may contact a broken tip of the reamer to be removed. The tip of the probe may also be shaped in the same V-type as disclosed as 306 in the embodiment of FIGURE 11, or flat.

Wedge shaped multi-conductor probe

FIGURES 18 and 19 disclose a probe 600 composed of wedge shaped segments 602 and 604 which are separated by means of insulation 606 which is preferably of the Mylar type and the entire unit coated with a thin non-conductive film 608.

These multiplicity of electrodes are connected in an alternating fashion to positive and negative terminals. The probe clamp of this type would be somewhat different in construction in that the jaw gripping structure would be such that one jaw contacted the positive electrodes and the other jaw connected the negative electrodes, thus contacting every other segment.

The end structure of this probe would be best in the form of an inverted cone 608. The tip of the cone would be at the end point of the central axis of the body of the probe.

Method and operation

The probe gripping members 102 are assembled so that their fulcrums 110 are adjacent one another with insulation 112 therebetween. The insulated collar 120 and rigid metallic ring 112 is slid over the outside of the central portion 106 thus forming an operable jaw clamp for the probe.

The assembled probe gripping member 100 is inserted into the opening 206 of the housing 202 until the flange 121 abuts the flange 208.

The plunger 218 is inserted into the other end of the housing with the flat forward portion 224 extending between the rearward portions 104. The pin 216 is inserted in slot 214 and into opening 217.

Wires 24 are attached to gripping members 102 by inserting screws 128 into openings 210 of the housing and 126 of the gripping members 102. The wires extending from the screws are then laid in slot 212 and collar 238 is slid over the end of the housing until the edges of slot 230 abut the wires in slot 212. The conical cover 232 is slid over the forward end portions 108 to insulate these.

Referring to FIGURE 8 one of the probes such as 300 is inserted into clamp 100 by moving plunger 218 with forward portion 224 to the rear (FIGURE 4). The probe is inserted with the plastic portion 310 extending between the two forward portions 108 and with the circular portion 308 in the opening 118 (FIGURE 6).

When the probe 300 is in place, the plunger is depressed as seen in FIGURE 5. The camming surface 226 will exert a pressure on inclined edges 114 of the rearward portion 104. This will close the forward portion 108 around the electrodes at 308 of the probe (FIGURE 7).

When a reamer or drill 44 is broken off in the root canal the welding probe 30 is inserted into the canal and placed in contact with the broken reamer. The plug 26 is connected to a welding power source and current is furnished to the probe 30. The probe is then welded to the instrument as seen in FIGURE 13 in detail. The device 10, including clamp 20 and probe 30, are withdrawn from the root canal 40, thereby removing the instrument 44 from its lodged position.

The dentist or a technician may remove the reamer and file the end of the probe back to its original shape.

While the invention has been described in connection with different embodiments thereof, it will be understood that it is capable of further modification, and this application is intended to cover any variations. uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention what I claim is:

1. An electrical probe for removing metal objects from the body, comprising:
   (a) a holder to which positive and negative electrical leads are connected,
   (b) an elongated probe mounted at one end on said holder and having a recess at its other free end for receiving part of the metal object to be removed from the body,
   (c) said probe having a plurality of conductors insulated from each other which extend the length of said probe and terminate with an exposed conductive end in said recess to form welding electrode tips, and
   (d) some of said conductors being connected to a positive electrical lead, and the remaining conductors being connected to a negative electrical lead, whereby the exposed conductor ends can engage said metal body and on supply of electric current to said conductors fixedly weld the conductor ends and said metal objects together to enable the metal object to be withdrawn with said probe.

2. The electrical probe for removing metal objects from the body as set forth in claim 1, wherein:
   (a) said elongated probe is very thin in cross section and can be inserted in the root canal of a tooth to retrieve a root canal instrument.

3. The electrical probe for removing metal objects as set forth in claim 1, wherein:
   (a) said one end of said probe is inserted within the end of said holder and may readily be removed therefrom.

4. The electrical probe for removing metal objects from the body as set forth in claim 1, wherein:
   (a) said recess is conical in shape and has sidewalls which include an angle of between 60 and 120°.

5. The electrical probe for removing metal objects from the body as set forth in claim 1, wherein:
   (a) said holder includes a clamp assembly which grips the said one end of said probe, and which is activated by a plunger assembly on the said holder.

6. An electrical probe for removing metal objects from the body, comprising:
   (a) a holder to which electrical leads are connected,
   (b) a probe having a plurality or elongated conductive elements separated by insulation material and having an exterior insulation covering,
   (c) one end of said probe being ragidly mounted on said holder and being electrically connected with said conductive elements,
   (d) the other end of said probe having a recess wherein a substantial portion of the walls thereof are formed by the exposed ends of said elongated conductive elements, and
   (e) half of the conductive elements being connected to a positive electrical lead, and half of the conductors connected to a negative electrical lead, whereby on supply of electrical current to said conductors the conductive ends and the metal objects to be retrieved are welded together to enable withdrawal of the metal object with said probe.

7. The electrical probe for removing metal objects from the body as set forth in claim 6, wherein:
   (a) said probe is circular in cross-section, and has two semi-circular electrical conductive elements with their flat sides facing each other and engaging a central strip of insulation material.

8. The electrical probe for removing metal objects from the body as set forth in claim 6, wherein:
   (a) said elongated probe is very thin in cross-section and can be inserted into the root canal of the tooth to retrieve a broken root canal instrument.

9. An electrical probe for removing metal objects from the body as set forth in claim 7, wherein:
   (a) said one end of said probe is inserted within the end of said holder and is engaged by clamping means within said holder to rigidly hold it in position.

10. Method of retrieving metal objects from the body, comprising:
    (a) inserting an electrical welding probe having an exterior insulative surface and a plurality of electrically separated electrodes into the body where its tip contacts a metal object to be removed,
    (b) applying a current to said electrodes to weld said probe to said metal object, and
    (c) withdrawing said probe and said metal object from the body.

11. The method of removing metal objects from the body as set forth in claim 10, wherein:
    (a) said welding probe is inserted into the root canal of a tooth to contact a broken reamer.

References Cited
UNITED STATES PATENTS

| | | | |
|---|---|---|---|
| 58,446 | 10/1866 | Mellen | 279—106 |
| 1,659,074 | 2/1928 | Becker | 279—106 |
| 1,862,653 | 6/1932 | Bean | 219—234 |
| 2,012,316 | 8/1935 | Miles | 128—2 |
| 2,154,654 | 4/1939 | Armenstrout et al. | 219—107 |
| 2,176,479 | 10/1939 | Willis | 128—2 |
| 2,218,131 | 10/1940 | Gipson et al. | 294—1 |
| 2,432,639 | 12/1947 | Webster | 129—238 |
| 2,438,279 | 3/1948 | Forney | 219—8 |
| 2,936,365 | 5/1960 | Niemi | 219—138 |
| 3,234,354 | 2/1966 | Penberg | 219—86 |

RICHARD A. GAUDET, *Primary Examiner.*

J. W. HINEY, *Assistant Examiner.*